No. 662,318. Patented Nov. 20, 1900.
C. H. SIMPSON & J. SENIOR.
SMOKE HOUSE.
(Application filed May 11, 1900.)

(No Model.) 3 Sheets—Sheet 1.

Witnesses, Inventors.

No. 662,318. Patented Nov. 20, 1900.
C. H. SIMPSON & J. SENIOR.
SMOKE HOUSE.
(Application filed May 11, 1900.)

(No Model.) 3 Sheets—Sheet 3.

UNITED STATES PATENT OFFICE.

CHARLES HENRY SIMPSON, OF SOUTHAMPTON, AND JOSEPH SENIOR, OF WAKEFIELD, ENGLAND.

SMOKE-HOUSE.

SPECIFICATION forming part of Letters Patent No. 662,318, dated November 20, 1900.

Application filed May 11, 1900. Serial No. 16,277. (No model.)

*To all whom it may concern:*

Be it known that we, CHARLES HENRY SIMPSON, residing at Roselle, Archers road, in the city and county of Southampton, England, and JOSEPH SENIOR, residing at 3 John street, Wakefield, in the county of York, England, subjects of the Queen of Great Britain, have invented new and useful Improvements in Smoking Bacon, Hams, Fish, and other Comestible Substances and Apparatus Therefor, of which the following is a specification.

This invention relates to means whereby bacon, hams, fish, and other comestible substances may be smoked and dried in a more simple and expeditious manner and with less shrinkage than heretofore and to that system of smoking and drying wherein the smoke is generated in a separate chamber and then passed through the chamber wherein the substances to be treated are placed. According to our invention we provide for extracting the moisture from the smoke after it has passed over the substances and mixing it with fresh smoke and, if desired, rewarming it in order to render it fit for again passing into contact with the substances. In practice the floor of the chamber wherein the substances to be treated are placed is perforated, and the smoke which is delivered through this perforated floor by a fan or blower is drawn from the top of the smoke-generating chamber, so as not to unnecessarily disturb the burnt ashes and draw them into the fan with the smoke. The two chambers are connected at the upper end, so that the smoke after passing over the substances will return to the smoke-generating chamber, flowing in its course through a condenser or moisture-extractor, wherein the moisture carried by the air is deposited, and thence, if necessary, through an air-warmer.

In practice two or more chambers for containing substances to be treated are generally arranged in connection with a single smoke-generating chamber.

To enable our invention to be fully understood, we will describe the same by reference to the accompanying drawings, in which—

Figure 1:
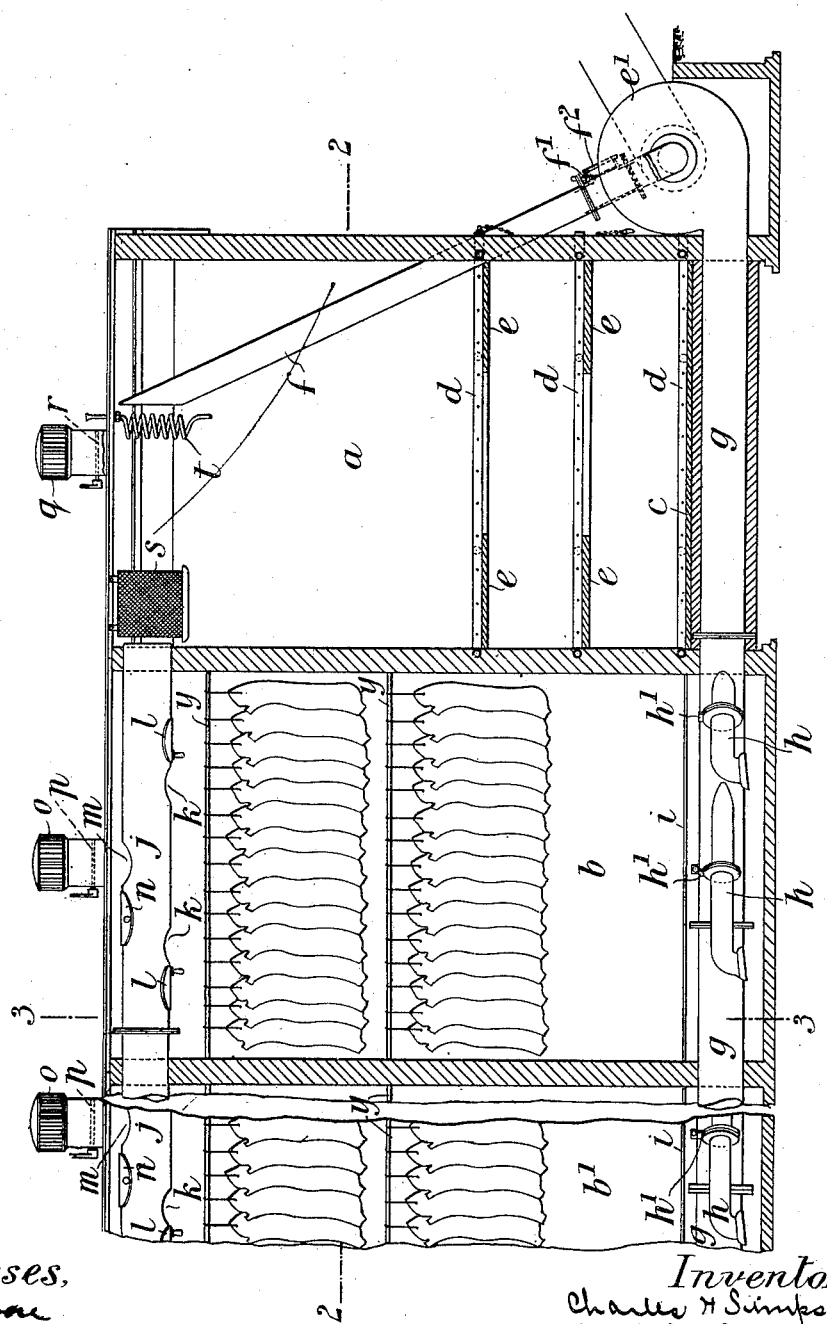
Figure 2:
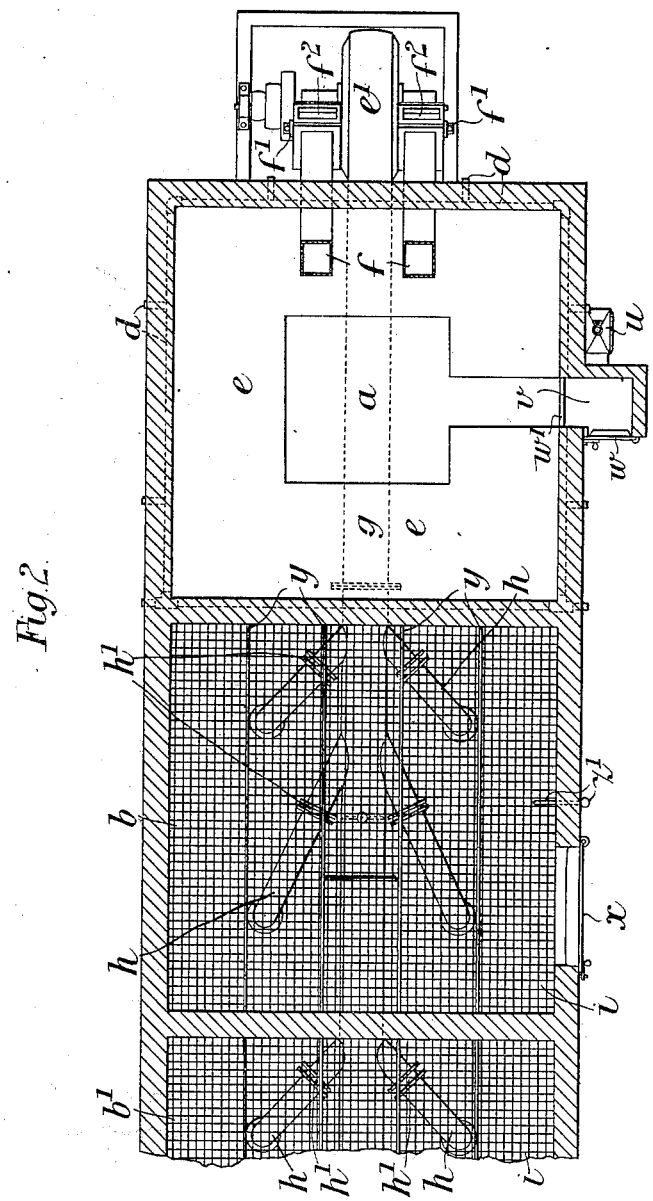
Figure 3:
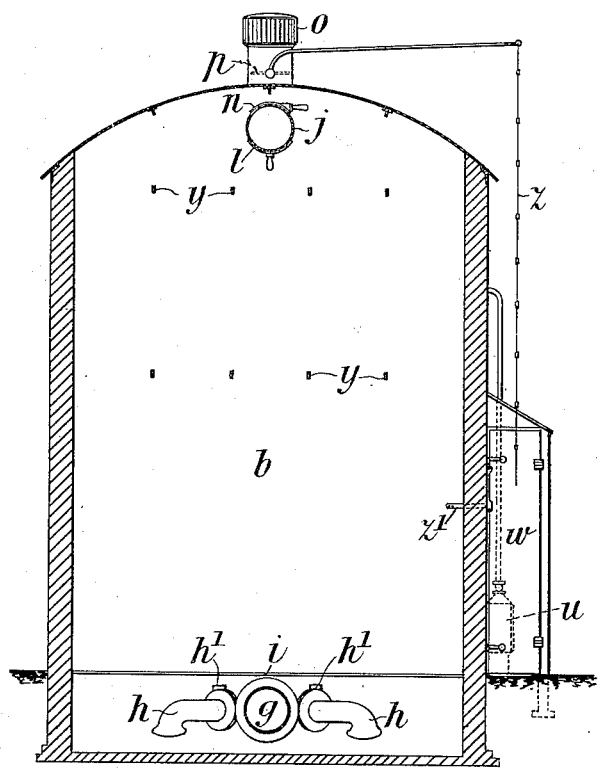

Figure is a longitudinal vertical section of apparatus arranged according to our invention. Fig. 2 is a horizontal section on the line 2 2, Fig. 1; and Fig. 3 is a transverse section on the line 3 3, Fig. 1.

$a$ is the chamber wherein the smoke is generated and which is hereinafter for convenience of description referred to as the "generating-chamber," and $b\ b'$ are chambers wherein the substances to be treated are placed, and which for convenience of description we will hereinafter refer to as the "smoking-chambers."

The floor $c$ of the generating-chamber $a$, upon which the sawdust or other smoke-producing material is to smolder, is surrounded by a perforated pipe $d$ for admitting air for supporting combustion, the supply of air through the said perforated pipes being regulated by any suitable means. In some cases the generating-chamber $a$ is provided with one or more shelves $e$ in order to afford additional space upon which the smoke-producing substances can be placed, and in this case the said shelf or shelves is or are provided with perforated pipes $d$, as before described. This construction is shown in Fig. 1.

$e'$ is a rotary fan or blower which will vary in size according to the amount of force required and which is designed to exhaust the smoke from the generating-chamber $a$ through the pipes $f$ and to deliver it into the smoking-chambers $b\ b'$ through the pipe $g$, which pipe is below each smoking-chamber $b\ b'$ provided with a series of arms or branches $h\ h$ for distributing the smoke as evenly as possible over the floor $i$, which is made of wire-gauze or other suitable perforated material. These branch pipes are provided with valves or dampers $h'\ h'$, by which the smoke can be shut off from either smoking-chamber $b$ or $b'$ and admitted to the other smoking-chamber, (or chambers, if two or more are employed.) As shown, the branch pipes $h\ h$ are also provided with downwardly-extending nozzles to render the distribution of the smoke more even than would be the case if the said branch pipes delivered horizontally or in an upward direction.

$j$ is a pipe through which the smoke passes from the smoking-chambers $b\ b'$ back to the generating-chamber $a$. This pipe, as shown, is provided in each smoking-chamber with two apertures $k$ $k$, which can be closed by covers $l$ $l$, and with another aperture $m$, which can be closed by a cover $n$, the said aperture $m$ being arranged immediately in conjunction with a ventilator or cowl $o$, which can be controlled by a valve $p$. The generating-chamber $a$ is also provided with a similar cowl $q$, controlled by a valve $r$. With this arrangement all the smoke-laden air within the generating-chamber $a$ and smoking-chambers $b$ $b'$ may be either continuously circulated, being drawn from the generating-chamber $a$ through the pipes $f$ and delivered to the smoking-chambers $b$ $b'$ through the pipe $g$ and branch arms $h$, whence it returns to the generating-chamber $a$ through the pipe $j$, or by more or less opening the valves $p$ $p$ and $r$ the fan $e$ will draw some fresh air through the cowl $q$, and a corresponding amount of smoke-laden air will be discharged from the chambers $b$ $b'$ through the cowls $o$ $o$, the lids $n$ $n$ being pushed back to allow of this. The lids $l$ $l$ can also serve for more or less adjusting the speed at which the current of smoke-laden air flows through the apparatus.

If the smoke is to be excluded from one of the smoking-chambers, the valves $h'$ $h'$ in connection with this chamber are closed to prevent the admission of smoke from the fan, and the lids $l$ $l$ and $n$ are also placed over their respective openings to exclude smoke returning to the generating-chamber through the pipe $j$.

In order to provide for introducing fresh air by the fan and blowing out the smoke from either smoking-chamber, we provide, in connection with the pipes $f$ $f$ of the fan, valves $f'$ $f'$, which serve for shutting off communication between the generating-chamber and the interior of the fan and opening communication between the latter and the atmosphere through openings $f^2$ $f^2$ in the pipes $f$ $f$, Figs. 1 and 2. The fan and parts of the pipes $f$ $f$ outside the generating-chamber are preferably lagged or covered with non-conducting material to prevent the loss of heat.

$s$ is the moisture-extractor, which may be of any suitable construction and which is arranged upon the pipe $j$ in such a manner that as the smoke-laden air reënters the generating-chamber $a$ it passes through the said extractor. This extractor is made removable, so that it may be readily detached when not required for use.

$t$ is a heating-coil which is used in some cases, if necessary, in order to reheat the smoke-laden air before it is again forced into the smoking-chambers $b$ $b'$. This coil $t$ can be heated from a stove $u$, arranged outside the apparatus, as shown in Figs. 2 and 3.

$v$, Fig. 2, indicates a trap or passage for affording access to the interior of the generating-chamber $a$ for introducing the smoke-generating fuel into the said chamber, and $w$ is the door of the said passage. In practice we prefer to employ two doors for preventing through communication between the external atmosphere and the interior of the generating-chamber $a$, one door being arranged to be closed while the other door is opened, and vice versa. This additional door is indicated at $w'$.

$x$ is the door for affording access to the smoking-chamber $b$.

It is to be understood that the doors $w$ and $x$ are so arranged that they can be hermetically closed during the operation of the apparatus. Suitable windows are arranged either in the doors or in the walls of the several chambers for permitting of inspecting the progress of the smoking process without opening the doors.

$y$ $y$ are bars upon which the articles to be treated, such as sides of bacon, are hung during the smoking operation, and $z$ is a chain or the like connected to a lever in connection with each of the valves $p$ and $r$ for opening or closing the latter, as required.

A thermometer such as $z'$, Figs. 2 and 3, is advantageously applied to the apparatus in such a manner that the internal temperature can be ascertained without opening the apparatus.

Among the advantages of the construction hereinbefore described we may mention the following: first, a great economy of space, as the arrangement permits of the materials to be treated nearer the floor instead of seven or eight feet from the floor, as has generally heretofore been usual, thereby permitting of say two tiers of substance being treated in a house which heretofore was adapted for treating one tier only, and, second, the shrinkage of the substances under treatment is considerably less than heretofore because of there being no direct contact with the hot ashes of the sawdust, and, furthermore, the the temperature being under control the saving of time in effecting the process of smoking is considerable.

Having now particularly described and ascertained the nature of our said invention and in what manner the same is to be performed, we declare that what we claim is—

1. In apparatus for smoking comestible substances, the combination with the generating-chamber, of a smoking-chamber separated therefrom, a fan, connections between the fan and the generating-chamber, connections between the fan and the smoking-chamber, connections between the smoking-chamber and the generating-chamber, a smoke-drying apparatus in the path of the smoke returning from the smoke-chamber to the generating-chamber, and a reheating device for reheating the smoke before it passes to the fan, substantially as described.

2. In apparatus for smoking comestible substances, the combination with the generating-chamber, of a smoking-chamber separated therefrom, a fan, connections between the fan and the generating-chamber, connections between the fan and the smoking-chamber, connections between the smoking-chamber and the generating-chamber, and a reheating device in the generating-chamber, substantially as described.

3. In apparatus for smoking comestible substances, the combination with a generating-chamber, of a separate smoking-chamber, a fan, connections between the fan and the generating-chamber, connections between the fan and the smoking-chamber, an outlet for said smoking-chamber, a valve controlling said outlet, an air-inlet for said fan, means for closing the connections between the fan and said generating-chamber, whereby by closing said connections and opening the air-inlet for the fan and the outlet for said smoking-chamber, the smoke can be blown out of the smoking-chamber, substantially as described.

4. In apparatus for smoking comestible substances, the combination with a generating-chamber provided with an outlet communicating with the open air, and a closure for said outlet, of a separate smoking-chamber, an outlet for the smoking-chamber, a closure therefor, a fan, connections from said fan to the generating-chamber and smoking-chamber and a communication between said chambers, whereby by opening the said closures more or less, air will be admitted into the generating-chamber and part of the smoke in the smoking-chamber will be expelled through the outlet therefor, substantially as described.

5. In apparatus for smoking comestible substances, the combination with the generating-chamber provided with an outlet communicating with the open air, and a valve controlling said outlet, of a separate smoking-chamber, an outlet therefor, a valve controlling said outlet, a fan, connections between said fan and the generating-chamber, connections between the fan and the smoking-chamber, and connections between said smoking and generating chambers whereby by opening the said valves, more or less, air will be admitted into the generating-chamber, and part of the smoke will be expelled from the smoking-chamber, substantially as described.

6. In apparatus for smoking comestible substances, the combination with a generating-chamber provided with an outlet communicating with the open air, and a valve controlling said outlet, of a separate smoking-chamber provided with an outlet, a valve closing said outlet, a return-pipe connecting the smoking-chamber with the generating-chamber, provided with inlet-openings, and an outlet-opening adjacent to the outlet for the smoking-chamber, valves controlling said inlet and outlet openings of said return-pipe, a fan, connections between said generating-chamber and said fan, and connections between said fan and said smoking-chamber, substantially as described.

7. In apparatus for smoking comestible substances, the combination with the generating-chamber, of a plurality of separate smoking-chambers, a fan, connections from said fan to the generating-chamber, connections between said fan and each of said smoking-chambers, means for cutting off said smoking-chambers from the fan, return connections from the smoking-chambers to the generating-chamber and means for cutting off said return connections, an air-inlet for said fan, a valve controlling said inlet, valves for cutting off the connections between the fan and the generating-chamber, to blow the smoke out of one or all of said smoking-chambers, substantially as described.

8. In apparatus for smoking comestible substances, the combination with a generating-chamber provided with an outlet, and a valve controlling said outlet, of a separate smoking-chamber, an outlet for said smoking-chamber, a valve controlling said outlet, a return connection between said smoking and generating chambers, a valve controlling said return connection, a drying device in said generating-chamber adjacent to the outlet therein, of said return connection, a reheating device in said generating-chamber, a fan, connections from said fan to said generating-chamber, cut-off valves for closing said connections, connections from said fan to said drying-chamber, an air-inlet for said fan, and a valve controlling said air-inlet, substantially as described.

CHARLES HENRY SIMPSON.
JOSEPH SENIOR.

Witnesses as to signature of Charles Henry Simpson:
JOSEPH W. HOPLEY,
HERBERT A. SINCLAIR.

Witnesses as to signature of Joseph Senior:
JNO. D. MASON,
EDITH MASON.